I. DAVIS.
EGG TESTER.
APPLICATION FILED FEB. 9, 1911.
993,965.
Patented May 30, 1911.
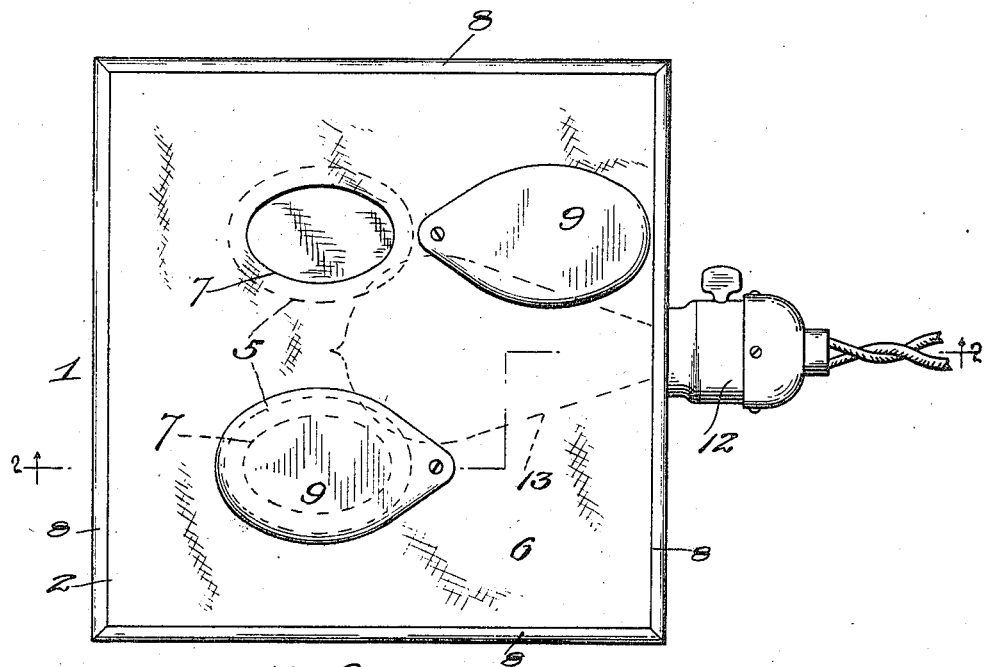
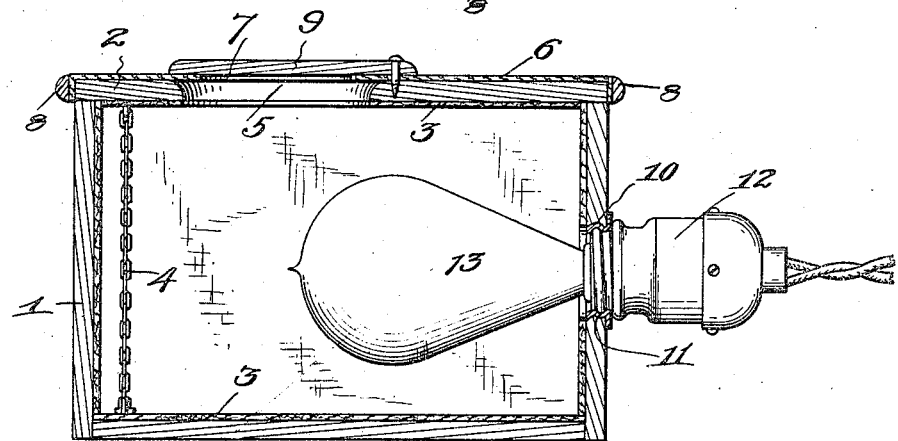
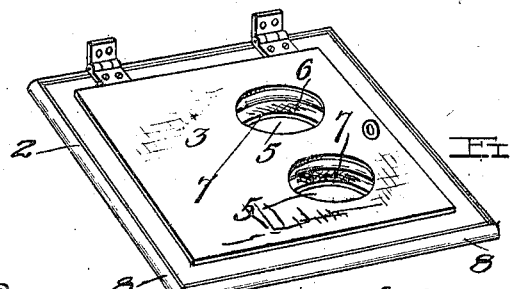
Inventor
Isaac Davis

UNITED STATES PATENT OFFICE.

ISAAC DAVIS, OF LAS VEGAS, TERRITORY OF NEW MEXICO.

EGG-TESTER.

993,965.

Specification of Letters Patent.

Patented May 30, 1911.

Application filed February 9, 1911. Serial No. 607,539.

*To all whom it may concern:*

Be it known that I, ISAAC DAVIS, a citizen of the United States, residing at Las Vegas, in the county of San Miguel and Territory of New Mexico, have invented certain new and useful Improvements in Egg-Testers; and I do declare the following to be a full, clear, and exact description of the invention, such as will enable others skilled in the art to which it appertains to make and use the same.

This invention relates to improvements in egg testers.

One object of the invention is to provide an improved construction of egg tester whereby the condition of the eggs tested thereby may be quickly and accurately determined.

Another object is to provide an egg tester which will be simple and inexpensive in construction, attractive in appearance and adapted to be placed on the counter in a sales room whereby eggs may be tested in the presence of the purchaser.

With these and other objects in view, the invention consists of certain novel features of construction, combination and arrangement of parts as will be more fully described and particularly pointed out in the appended claim.

In the accompanying drawings: Figure 1 is a plan view of an egg tester constructed in accordance with my invention; Fig. 2 is an irregular vertical sectional view on the line 2—2 of Fig. 1; Fig. 3 is an inverted perspective view of the cover.

My improved egg tester comprises a box or cabinet 1 which may be of any suitable size and shape and is here shown as being rectangular. The box 1 is provided with a hinged top or cover 2 and an asbestos lining 3. The top or cover 2 has fastened thereto one end of a chain 4 the opposite end of which is secured to the bottom of the box, said chain being provided to support the cover when swung back in an open position. In the top of the box are arranged two elliptical shaped egg receiving openings 5 in which are adapted to be laid the egg to be tested.

Stretched over the outer side of the top of the box is a covering 6 of black or dark colored cloth or felt. In the covering 6 over the openings 5 are formed similarly shaped openings 7 said openings being of less size than the openings 5 whereby the edges of the openings in the cloth form cushions which protect the egg from being cracked by the hard edges of the openings in the top, said projecting edges of the cloth also forming a light tight closure between the edges of the openings and the sides of the eggs. The cloth covering 6 is secured to the top by binding strips 8 which are secured to the edges of the top as shown. The openings in the covering and top are closed when not in use by cover plates 9 which are pivotally secured to the top of the box adjacent to one end of the openings.

Formed in one side of the box is a circular opening 10 having a threaded bushing 11 into which from the outer side of the box is screwed an electric lamp socket 12 into which from the inner side of the box is screwed an electric lamp 13 the light from which will penetrate the eggs if fresh when placed in the egg receiving openings in the top of the box, thus indicating the condition of the same.

By means of my improved tester eggs may be readily tested in a lighted room thus enabling the tester to be placed in a conspicuous place in a store and eggs tested in full view of the prospective purchaser. This positive proof of the wholesomeness of the eggs tends to more readily effect the sale of the same.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claim.

Having thus described my invention, what I claim is:

An egg tester comprising a box having an asbestos lining, a top hingedly connected to said box, said top having formed therein egg shaped openings adapted to receive and support the eggs to be tested, a covering of dark colored fabric arranged over the outer side of said top, said covering having holes formed therein over the holes in the top, covers pivotally mounted on the top and adapted to open and close the openings in the latter and a lamp arranged in the box.

In testimony whereof I have hereunto set my hand in presence of two subscribing witnesses.

ISAAC DAVIS.

Witnesses:
CORA G. BAILEY,
GEO. H. HUNKER.

Copies of this patent may be obtained for five cents each, by addressing the "Commissioner of Patents, Washington, D. C."